United States Patent

[11] 3,545,817

[72] Inventor Gordon W. Yarber
6070 Ramirez Canyon Road, Malibu,
California 90265
[21] Appl. No. 792,344
[22] Filed Jan. 21, 1969
[45] Patented Dec. 8, 1970

[54] BRAKE CONTROL MECHANISM
32 Claims, 11 Drawing Figs.
[52] U.S. Cl. .................................................... 303/21,
303/20
[51] Int. Cl. ..................................................... B60t 8/08
[50] Field of Search........................................ 303/20, 21

[56] References Cited
UNITED STATES PATENTS
3,017,145  1/1962  Yarber .......................... 303/21(A)UX
3,245,213  4/1966  Thompson et al. ..........303/21(BB)UX

*Primary Examiner*—Duane A. Reger
*Attorney*—Charlton M. Lewis

ABSTRACT: In the described brake control system an electrical control signal, typically an analog representation of a function of some physical variable, is converted to digital form, and the brake pressure is modified stepwise under control of the resulting digital signals. A variety of valve structures is described by which desired control actions are obtainable in response to digital signals. Two phases of brake control are imposed. The command pressure for the entire vehicle is modified in accordance with a measured function of road friction, typically derived from vehicle deceleration. Such control may either reduce the available pressure to a variable fraction of the command pressure, or permit the brake pressure to follow the command signal up to a limiting value that is variable. The pressure for each wheel is also subject to control by a skid signal for that wheel. Each phase of such control may be further modified under control of the other.

INVENTOR.
GORDON W. YARBER,
By Charlton M. Lewis

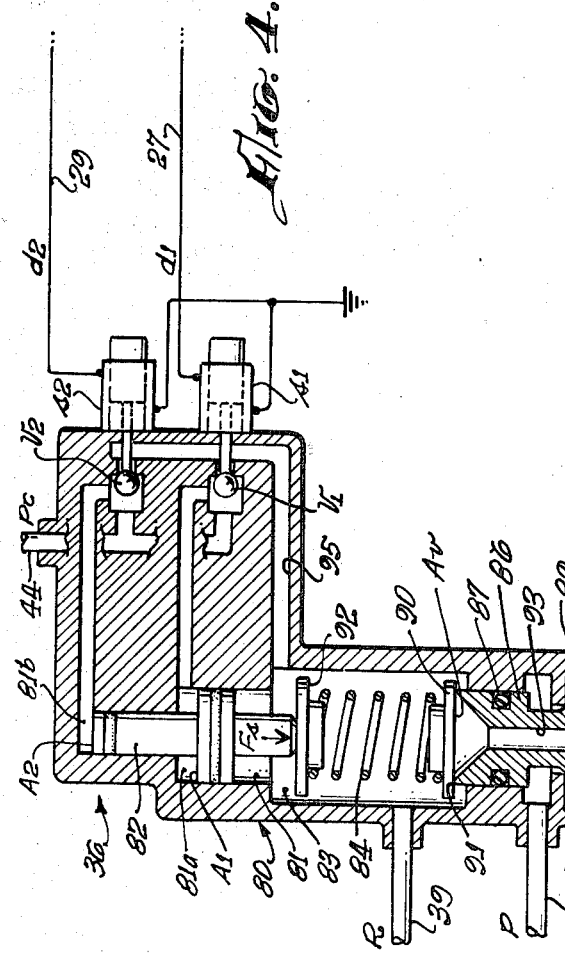
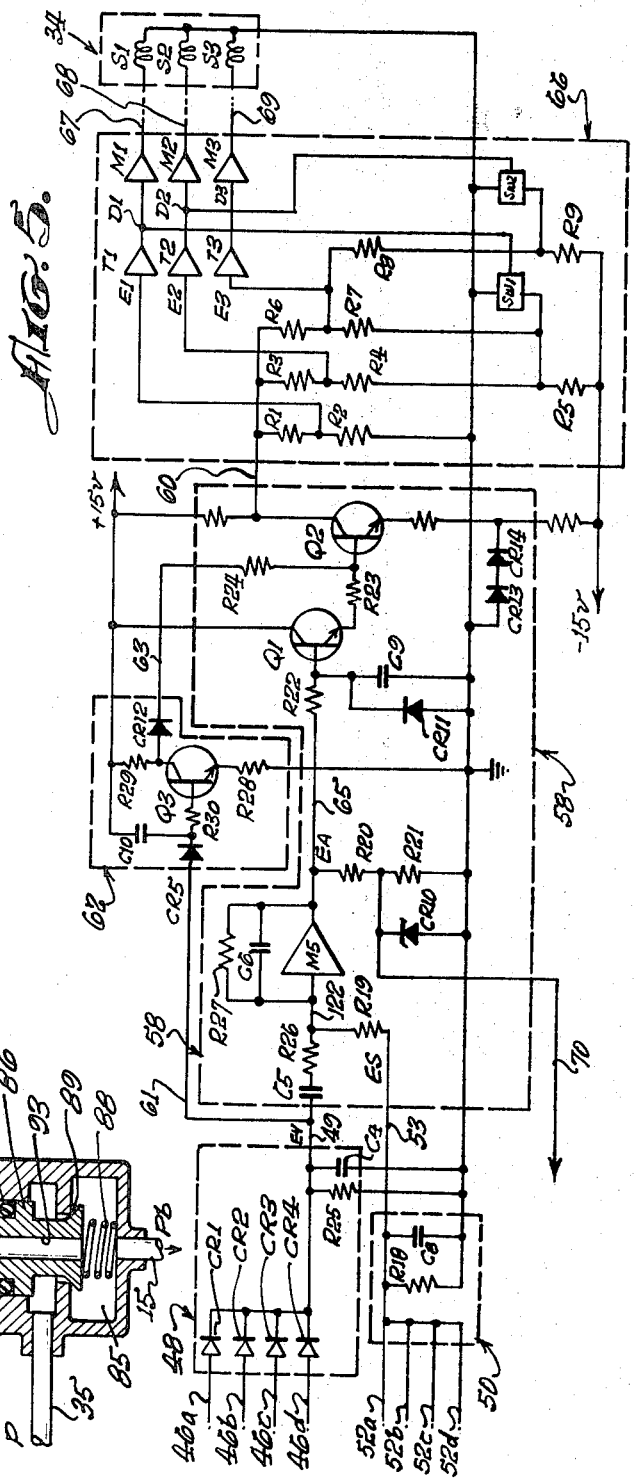

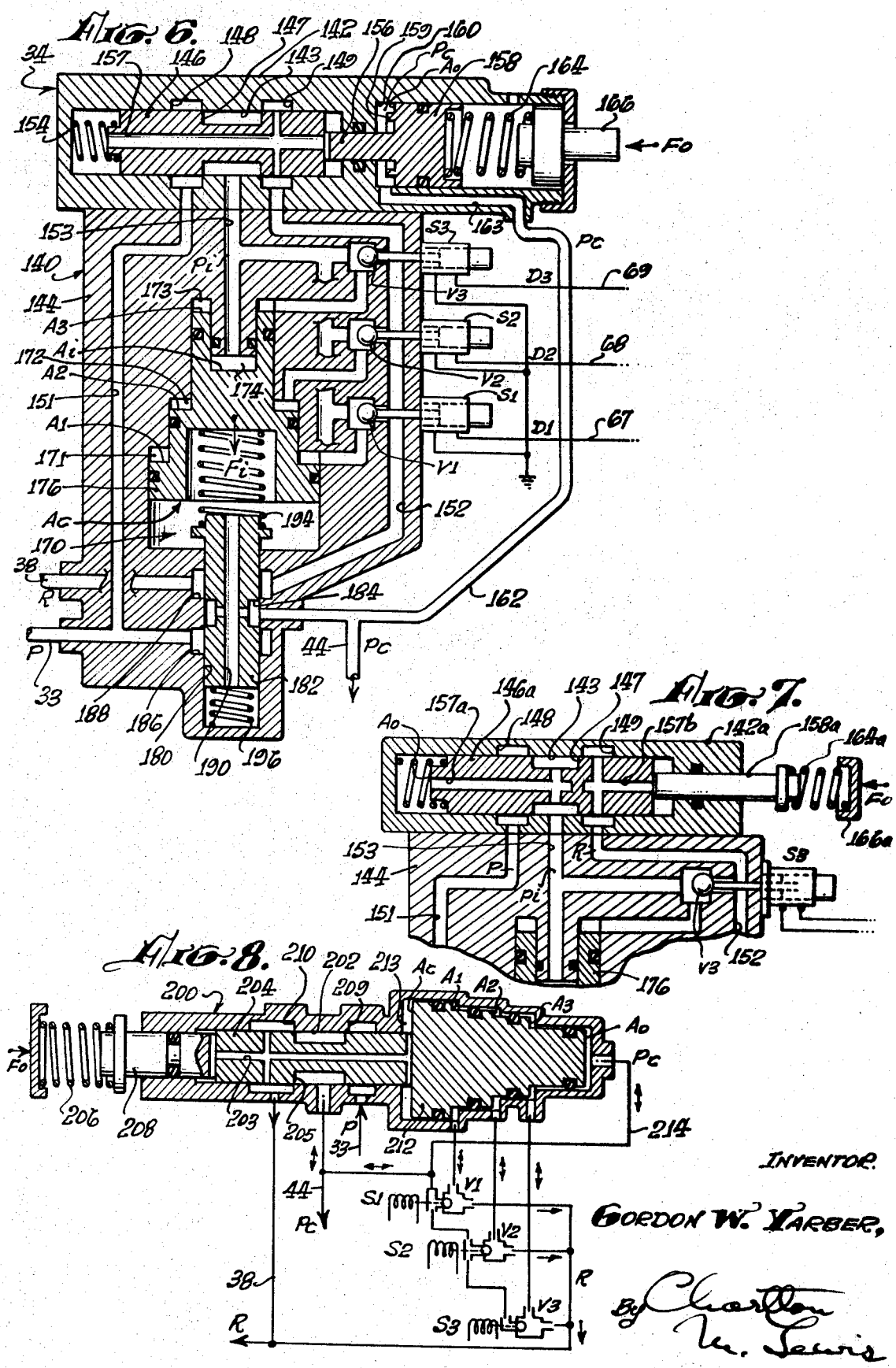

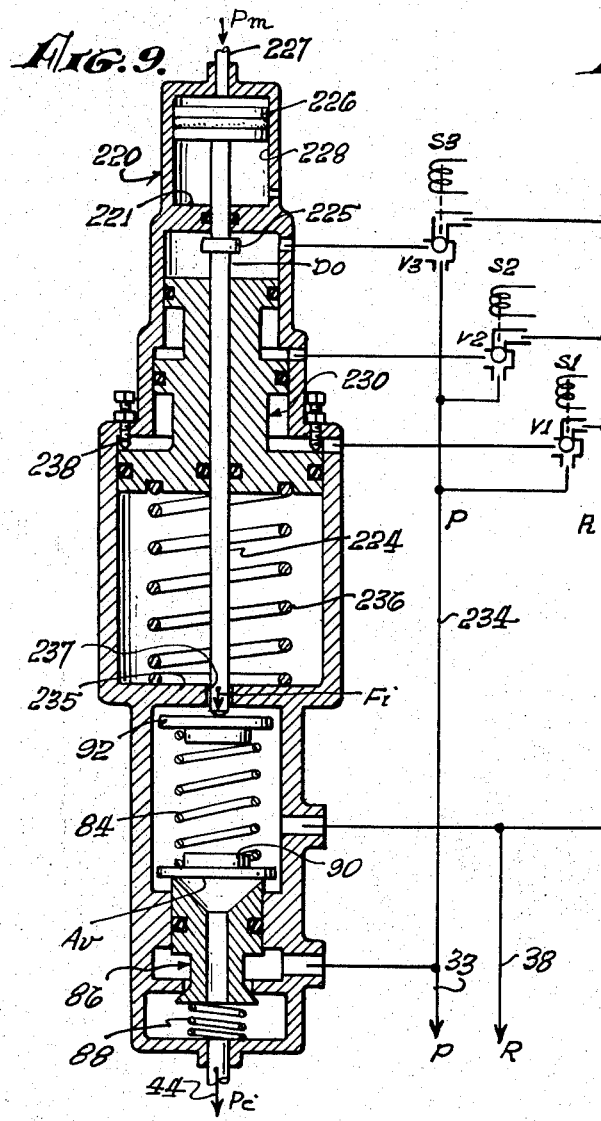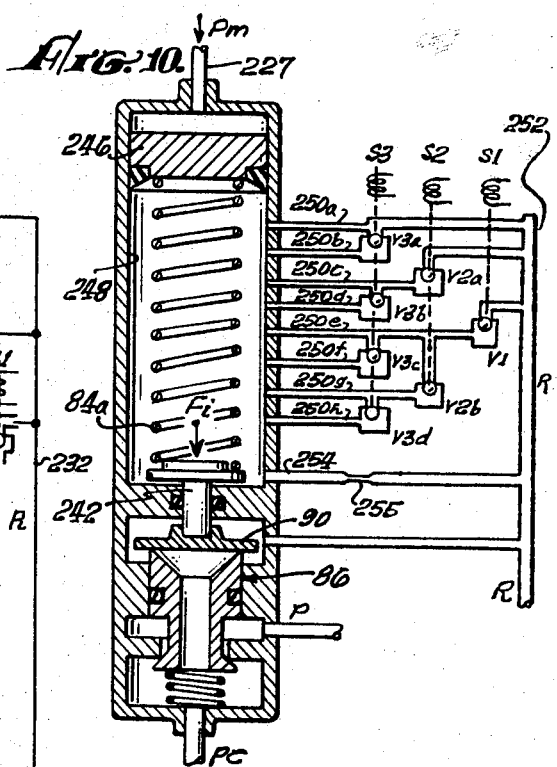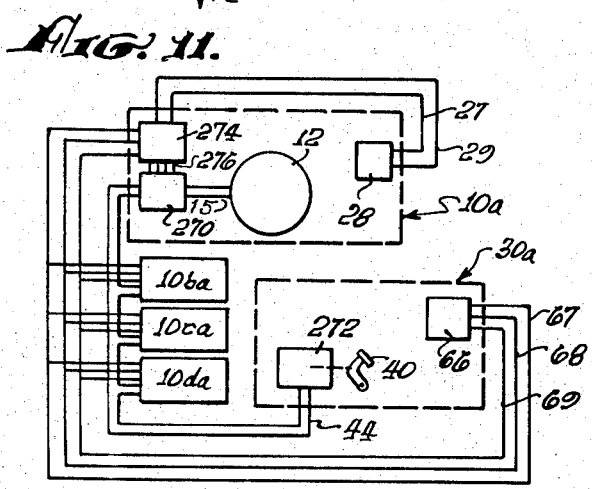

BRAKE CONTROL MECHANISM

This invention has to do generally with the control of vehicle wheel brakes to provide optimum braking action under a wide range of operating conditions.

More particularly, the invention provides a mechanism for limiting or modulating the pressure supplied to a hydraulic brake in accordance with the actual coefficient of friction of the wheel on the road to minimize the tendency of the wheel to skid, and for controlling any skid that may occur by promptly and positively reducing the brake pressure by the minimum amount actually required for such control.

One aspect of the invention regulates the brake pressure under digital control in accordance with a measurable physical quantity. It is common practice to develop an electrical signal that represents the value of a physical quantity and to control the brake pressure in response to the electrical signal. It is difficult, however, to obtain in that way a smoothly graduated control that is fully reliable and accurately reproducible. Valve mechanism for continuously modifying a fluid pressure in proportion to a variable electrical signal tends to be unreliable in operation, to be heavy and bulky in structure, and to consume an excessive amount of electrical energy. On the other hand, if the control system produces only one or two discrete steps of pressure modulation in response to predetermined threshold values of the electrical signal, the resulting pressure changes are too abrupt to provide a realistic approximation of a smooth function.

The present invention solves that difficulty by increasing the flexibility of stepwise control. In particular, the invention makes feasible the positive and reliable production of a greatly increased number of discrete steps of pressure modulation. A desired function of a measured physical variable can then be approximated to substantially any required degree of accuracy, while retaining the simplicity and reliability of positive valve action.

Such increased flexibility of stepwise pressure control is accomplished by the invention by utilizing digital techniques. The electrical control signal, which is typically an analog representation of some function of one or one or more physical quantities, is converted to digital form in accordance with a definite selected digital code. The resulting digital signals are then supplied to a suitable control valve structure, which produces the desired stepwise pressure modulation.

A digital code, as that term is employed in the present specification and claims, comprises a plurality of distinct code digits having different numerical significance. For most purposes it is preferred to utilize binary digits, which are based on a radix of two, so that adjacent digits differ in numerical significance by a factor of two. The two alternative values of each binary digit are typically represented electrically by presence and absence of a voltage, open and closed conditions of a circuit, or the like. The invention provides valve structure that responds positively to the signal for each digit, producing a distinctive component of pressure modulation that accords with the numerical significance of the corresponding digit. The components for the respective digits are effectively summed by the valve mechanism, producing an overall pressure modulation that corresponds to the complete digital code signal. Such modulation may include the full range from zero to maximum pressure, or may be limited to a restricted portion of that range.

That aspect of the invention has the advantage that a relatively large number of steps of pressure modulation can be produced under control of a moderate number of discrete signals. With a binary digital code, for example, three distinct steps of pressure modulation can be produced under control of only two signals, seven steps can be controlled by only three signals, fifteen steps by four signals, and so on. In practice, seven discrete steps in addition to the normal pressure usually provide a fully satisfactory approximation of a continuously varying function, producing effectively smooth and accurate modulation of the braking action.

Such digital modulation of the brake pressure may be carried out independently of the initial generation of hydraulic pressure in response to the command signal, or in combination with such command action. If the command signal is in digital form, as in some railway brake systems, the digital modulation signal of the present invention may, for example, be combined digitally with the command signal before conversion to hydraulic pressure.

A further aspect of the present invention provides a dual control of brake pressure, both phases or components of control being superimposed on the initial command. That command action will be assumed for convenience of description to be performed manually by an operator, but the invention is equally applicable to an unmanned vehicle, for example, in which braking is initiated automatically. In accordance with this aspect of the invention, the pressure commanded by the operator is first modulated or adapted in accordance with a signal that varies with the coefficient of friction between the vehicle wheels and the road surface. That adaptive control typically supplies the full commanded pressure to the brakes under conditions of normal coefficient of friction, but reduces or limits the commanded pressure to progressively lower values as the road friction falls below the normally expected value. That pressure reduction or limitation applies uniformly to all wheels, or to all wheels of a group. The second phase of the dual control is applied individually to the pressure supplied to each wheel, or to the wheels of each axle, reducing that pressure in response to a signal that indicates an incipient skidding condition of that particular wheel or axle. That skid signal is typically derived from the rate of deceleration of the individual wheel, and preferably represents the difference between the deceleration of that wheel and the deceleration of the entire vehicle. Either or both phases of control may be applied through digital signals in the manner already described.

An advantage of that dual type of brake pressure control is that under conditions of abnormally low road friction the adaptive phase of control reduces or limits the actual brake pressure for all wheels to an appropriate fraction of the command pressure, thus reducing the likelihood of a skid. And, if an incipient skid does occur, it is more readily and more promptly controlled, due to the lower applied pressure. Both phases of pressure modulation are preferably carried out by respective valves, or by a common valve, of relay type, whereby the full supply and return pressures are immediately available for producing rapid flow of whatever volume of fluid is needed to effect the required pressure change.

In accordance with a further aspect of the invention, the adaptive control system utilizes as a measure of road friction the actual rate of deceleration of the vehicle. A signal representing the vehicle deceleration is typically derived electronically from the measured angular velocities of a plurality of braked wheels. That particular selection of primary control variable will be assumed for purposes of description. The braking pressure actually applied during a braking action is then controlled primarily by the command signal, typically a force applied to the brake pedal, but is modulated in accordance with a signal representing vehicle deceleration.

In one form of the invention the pressure delivered to the brake (in absence of a skid signal) represents a definite fraction of the initially commanded pressure, the fraction varying with the vehicle deceleration. At zero vehicle deceleration, as at the start of brake application, for example, that fraction may be assigned a fixed minimum value, such as 30 percent. The fraction then increases progressively with increasing vehicle deceleration, typically reaching 100 percent at a value of vehicle deceleration that corresponds to a normally rapid stop on a pavement providing normal coefficient of friction.

In another form of the invention, which is generally preferred, the pressure delivered to the brake corresponds in normal manner to the command signal up to a limiting pressure value. That limiting brake pressure has a definite selected value when the vehicle deceleration is zero, and increases progressively with increasing vehicle deceleration. Above a selected value of vehicle deceleration, which represents normal pavement conditions, the limitation is no longer imposed, and full normal brake pressure is available.

In accordance with a further aspect of the invention, the adaptive phase of pressure control is modified in response to an abnormal number or severity of skid control actions of the second phase of the control. That modification preferably has the characteristic that the command pressure is reduced by a larger factor or limited to a lower value in presence of unusually many or prolonged antiskid actions.

A full understanding of the invention, and of its further objects and advantages, will be had from the following description of certain illustrative manners of carrying it out. The particulars of that description, and of the drawings which form a part of it, are intended only as illustration and not as a limitation upon the scope of the invention.

In the drawings:

FIG. 4 is a schematic section representing an illustrative skid control valve in accordance with the invention;

FIG. 5 is a schematic diagram representing circuitry of a typical adaptive control system;

FIG. 6 is a schematic section representing an illustrative valve for adaptive control;

FIG. 7 is a fragmentary section representing a modification of FIG. 6;

FIG. 8 is a schematic section representing a further illustrative valve structure;

FIG. 9 is a schematic section representing still another illustrative valve structure;

FIG. 10 is a schematic section representing a further modification; and

FIG. 11 is a schematic diagram representing a modified system.

SYSTEM OPERATION

General

Figure 1:
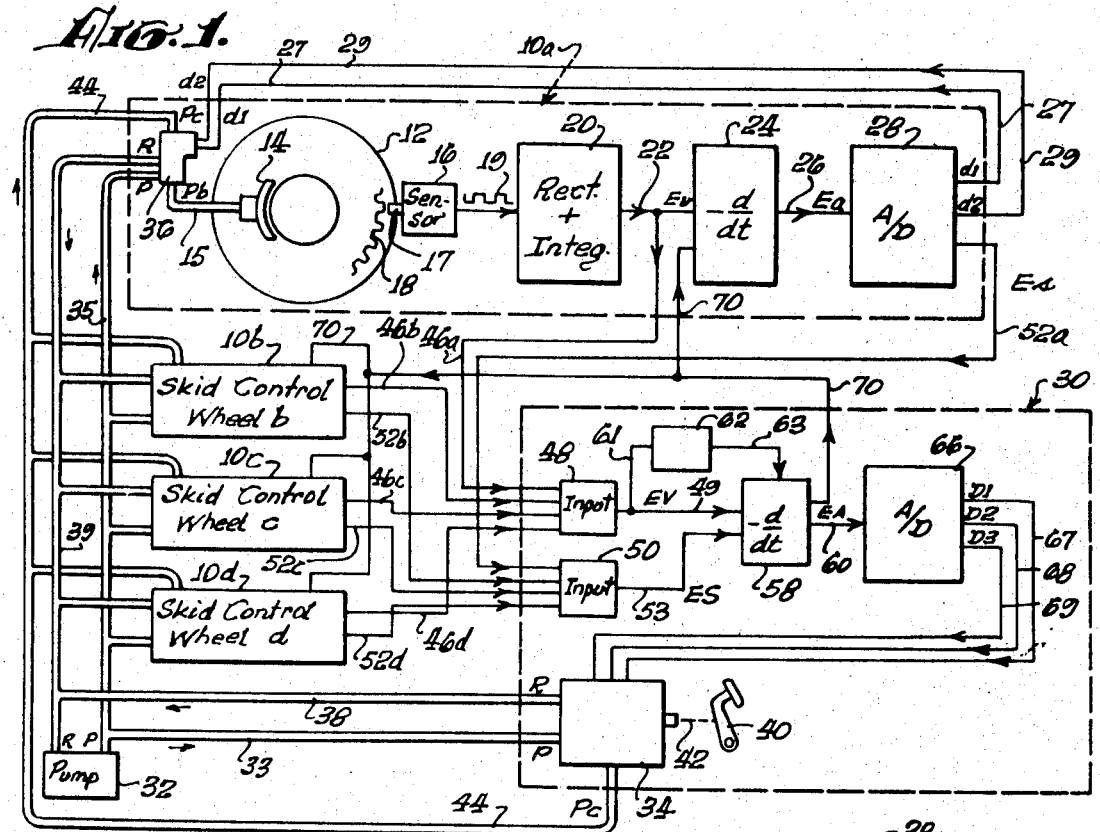
FIG. 1 is a block diagram representing an illustrative system embodying the invention.

In the illustrative embodiment of the invention represented in FIG. 1, the skid sensing and skid control apparatus associated specifically with one individual wheel is designated by the number 10a. Corresponding apparatus for wheels b, c and d is represented only in block form at 10b, 10c and 10d, respectively. In the case of a motor vehicle, for example, those four wheels may be considered to represent either two front and two rear wheels or the four rear wheels of a tandem drive. The system may be modified to control any desired number of braked wheels. Adaptive control apparatus is indicated generally by the numeral 30, receiving input signals from the individual wheel systems 10a through 10d and exerting control action which jointly affects the brakes of all the wheels a through d.

A pump or other source of press of pressurized hydraulic fluid at a selected supply pressure P is represented schematically at 32 with supply conduit 33 leading to the master control valve 34 and with supply conduit 35 leading to the control valve 36 of wheel system 10a and to the respective control systems 10b to 10d for the other individual wheels. Fluid is returned to pump 32 at low return pressure R, typically close to atmospheric, via the conduits 38 and 39. Brake initiation is controlled by any suitable command mechanism, represented schematically as a foot pedal 40 with mechanical connection 42 for applying a command force to a pressure regulating valve. That command valve is typically incorporated in master control valve 34, which also performs the adaptive control function. Valve 34 produces in its output conduit 44 a brake control pressure Pc that is responsive both to the manual control force and to the adaptive control mechanism to be described.

Each individual wheel system, as exemplified in system 10a, comprises the vehicle wheel 12 with the hydraulic brake 14, which is operated in response to hydraulic pressure supplied via the conduit 15. Associated with each wheel 12 is an electromagnetic sensing device or pickup, indicated schematically at 16. Pickup 16 typically comprises a coil wound on a core 17 which cooperates magnetically with a toothed armature 18 mounted on the wheel. As each tooth of armature 18 passes core 17 a current pulse is induced in the coil. The resulting pulses vary in frequency and amplitude in accordance with the velocity of wheel rotation. Those pulses are amplified and limited in known manner to produce a series of square wave pulses 19 of uniform amplitude and of frequency corresponding to the wheel speed. Pulses 19 are rectified and integrated at 20 to produce on the line 22 a direct current voltage signal Ev that varies in magnitude directly with the wheel speed. Wheel speed signal Ev is utilized as primary input variable for the skid control circuitry for each wheel, and the wheel speed signals for all wheels are used jointly as primary input variables for the adaptive control system 30.

Skid Control System

In the skid control system for each wheel, the wheel speed signal Ev from line 22 is supplied to the differentiating and inverting circuit 24, which may be of known type and which produces on the line 26 a positive direct current voltage signal Ea proportional to the angular deceleration of wheel 12. The time constant of the differentiating circuit is suitable for representing the rapid speed changes associated with skid actions. Differentiating circuit 24 is preferably also supplied via the line 70 with a signal representing the rate of vehicle deceleration, which may be developed in a manner to be described. That signal is utilized in the differentiating circuit as a reference level for computing the rate of wheel deceleration, so that the output signal Ea on line 26 represents essentially the excess of the wheel deceleration over the value corresponding to the vehicle deceleration.

In accordance with one aspect of the present invention, wheel deceleration signal Ea is supplied to circuitry represented schematically at 28 and acting as an analog to digital converter. The resulting digital signal typically comprises a plurality of binary signals representing the digits d1, d2, etc., of progressively decreasing numerical significance. Those signals are amplified and supplied to the respective output lines 27 and 29. Any desired number of digits and corresponding lines may be employed, according to the number of discrete steps of brake control action that are required.

In normal condition of the system, when wheel 12 is not decelerating abnormally fast, the wheel deceleration signal Ea on line 26 is essentially zero and the binary digits d1 and d2 have respective values that form a digital code representation of that zero value. As Ea increases progressively past successive threshold values, which may be considered as separating discrete value regions 0, 1, 2 and 3, the code digits shift abruptly to the corresponding code configurations. Decreasing value Ea causes corresponding shifts of the code digits in the opposite directions at threshold values that are essentially the same or somewhat lower. The invention may use the conventional code shown in table 1, in which d1 represents the digit of greater significance.

TABLE 1

|  | d1 | d2 |
| --- | --- | --- |
| Analog value regions: |  |  |
| 0 | 0 | 0 |
| 1 | 0 | 1 |
| 2 | 1 | 0 |
| 3 | 1 | 1 |

Digit value 0 is typically represented by effectively open circuit condition of the corresponding line 27 or 29, and value 1 is represented by connection of that line to a source of power within circuit 28 suitable to operate a valve solenoid, either directly or after amplification. The threshold values are typically selected so that step 1 represents only slightly greater wheel deceleration than corresponds to maximum normal vehicle deceleration; step 2 represents a clear incipient skid; and step 3 represents a level of skidding that can only be reliably checked by full release of the brake.

The digital signals on lines 27 and 29 are supplied to the skid control valve 36. That valve acts as a relay valve to produce in brake conduit 15 a pressure that is responsive to the control pressure Pc in conduit 44, but modulated stepwise in response to the digital control signals. In absence of such a control signal on either line 27 or 29, that is, with both lines effectively open circuited, the output pressure in conduit 15 typically corresponds directly to the control pressure Pc in conduit 44. In presence of an incipient skid, or under full skid conditions, one or both of lines 27 and 29 carries a control signal, reducing the brake pressure to a selected definite fraction of the command pressure, or to zero. The digital control system permits three distinct conditions of reduced pressure to be controlled by only two signal lines 27 and 29 and two corresponding valve solenoids in valve 36 FIGS. 2 and 4).

Since skid control valve 36 acts as a relay valve, the output pressure in conduit 15 is maintained by hydraulic fluid from pressure supply conduit 35, so that ample fluid is available for rapid brake application or reapplication without significantly loading control conduit 44. Also, each relay valve 36 is connected via return pressure conduit 39 to the suction side of pressure source 32. Hence, when brake 14 is abruptly relieved in response to a digital skid control signal, fluid from the brake is able to escape through return conduit 39, thus permitting rapid and complete brake release when required. In practice, valve 36 is preferably positioned closely adjacent the brake that it controls, making conduit 15 relatively short.

Adaptive Control System

Adaptive control system 30, as shown illustratively in FIG. 1, receives the wheel speed signal Ev from line 22 of each brake control system 10. Those signals are supplied via the respective lines 46a through 46d to the input circuit 48. That circuit produces on the line 49 an electrical signal which represents a desired function of the four input signals Ev. That function typically corresponds to the largest of the respective wheel speed signals Ev, thus normally representing the velocity of the entire vehicle. That vehicle velocity signal EV on line 49 is differentiated, inverted and amplified at 58 to produce an electrical signal that represents primarily the rate of deceleration of the vehicle. The time constant of differentiating circuit 58 is typically from 0.1 to 0.5 sec., and is appreciably longer than that of circuit 24 in each wheel system 10. The deceleration signal is modified, as will be described, in response to signals supplied on the lines 53 and 63, producing on the line 60 the final analog vehicle deceleration signal EA. A suitable vehicle deceleration signal is also produced by circuit 58 on line 70 for supply to the respective skid control systems, as already mentioned.

The analog signal EA on line 60 is converted by the circuitry 66 from analog to digital form, typically producing on the respective lines 67, 68 and 69 three binary digital signals D1, D2 and D3. Those signals are supplied as input control signals to the adaptive control valve 34, resulting in positive stepwise modification of the brake control pressure Pc that is produced in conduit 44 in response to manual command pedal 40. That control pressure is supplied to the skid control valve 36 of the system for each wheel, where it is subject to further modification in response to a skid signal for the individual wheel, as already described.

The adaptive control system preferably includes means for reducing the resulting control pressure Pc for a limited time in response to each skid control action. For that purpose, a wheel skid signal Es is developed in each skid control system 10 in any convenient manner. Those signals are supplied via the lines 52a through 52d to the input circuit 50, which produces on the line 53 an electrical signal ES representing a desired function of the skid conditions of all the wheels. That signal is combined with the vehicle deceleration signal by circuitry within differentiator 58, reducing the magnitude of the vehicle deceleration signal EA. That action increases progressively with the total duration of the skids and decays gradually with a predetermined time constant after skid termination. Such modification of the vehicle deceleration signal tends to enhance the signal variations that result from varying road conditions. A slippery road, for example, tends to promote skidding, reducing the actual rate of vehicle deceleration for a given brake command. The signal EA on line 60 is then reduced both in response to the lower actual vehicle deceleration and in response to the combined skid signal ES injected from line 53.

The combined skid signal ES on line 53 is preferably so developed and utilized as to perform a further function. Under the unusual condition of simultaneous skidding of all wheels the vehicle velocity signal EV decreases abruptly, tending to produce a sharp increase in the vehicle deceleration signal EA on line 60. If not compensated, such a spurious indication of rapid vehicle deceleration would have the undesirable effect of indicating effective braking action and increasing the available braking pressure Pc whereas the actual condition requires the opposite response. That tendency is compensated in the present system by making skid signal ES large enough, when all wheels are skidding, to override the spurious vehicle deceleration signal.

A further modification of vehicle deceleration signal EA is made to insure availability of full braking action when the vehicle is at rest. Under that condition, the regular vehicle deceleration signal is zero, which would cause the adaptive control 30 to reduce Pc to its minimum value. To override that action, the vehicle velocity signal EV from line 49 is supplied via the line 61 to the circuit 62, which develops on the line 63 a signal that is typically zero at normal vehicle velocities but becomes large as zero velocity is approached. That signal is effectively summed with EA in circuitry 58, producing on line 60 a simulated vehicle deceleration signal which makes available the full commanded brake pressure when the vehicle is stationary.

ILLUSTRATIVE STRUCTURE

Skid Control System

Figure 2:
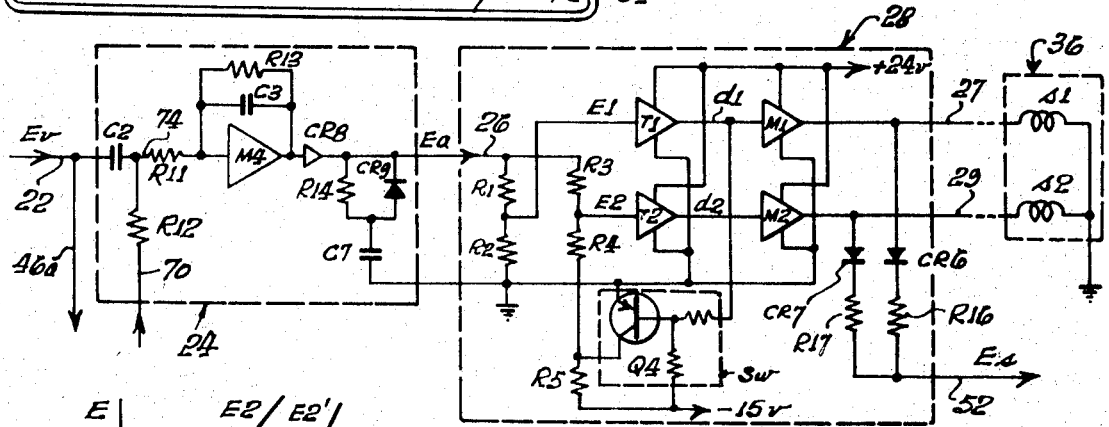
FIG. 2 is a schematic diagram representing circuitry of a typical skid control system.

Wheel Deceleration Signal. FIG. 2 represents illustrative circuitry for differentiator and inverter 24 and for analog to digital converter 28 in the skid control system of each wheel. Conventional components and connections, such as power supplies for amplifiers, and the like, are omitted in general from FIG. 2 and also from FIG. 5 for clarity of illustration. The rectified and amplified wheel velocity signal Ev on line 22 is differentiated by the capacitance C2 in combination with the operational amplifier M4 with negative feedback circuit via the parallel-connected resistance R13 and capacitance C3. During vehicle deceleration the positive wheel velocity signal on line 22 decreases, tending to drive line 74 negative. Amplifier M4 produces at its output a positive signal that represents the rate of wheel deceleration. That signal is preferably modified or shaped in two primary respects.

During rapid braking of a vehicle under normal conditions the rate of vehicle deceleration is appreciable, and it is preferred that the wheel deceleration signal represent only the excess of the wheel deceleration over a reference or threshold value corresponding to the vehicle deceleration. That is accomplished in the present circuit by supplying the positive going vehicle deceleration signal from line 70, already referred to, via the summing resistance R12 to line 74, where it is combined with the negative going wheel deceleration signal. Since those two signals are of opposite polarity, the result is effective subtraction of the vehicle deceleration from the wheel deceleration. Resistance R11 introduces a time constant, delaying termination of a skid signal.

At the output from amplifier M4 the wheel deceleration signal is modified by the memory circuit comprising the series diode CR8 and the shunt to ground via the capacitance C7 and the parallel connected resistance R14 and diode CR9. During increasing wheel deceleration, amplifier M4 supplies positive current via CR8 sufficient to charge C7 via R14 with negligible delay in the transmission of the signal to output line 26. When the rate of wheel deceleration decreases, R14 is shunted via CR9, but discharge of C7 through the amplifier is blocked by CR8. Decay of the positive signal on line 26 is therefore slowed to a rate determined by the RC time constant corresponding to C7 and the effective resistance between line 26 and ground within analog to digital circuit 28. That time constant is selected to delay reapplication of the brake long enough after each skid signal to insure effective recovery from the skid.

Analog To Digital Converter. The analog to digital converters represented at 28 and 66 in FIG. 1 may be of any suitable type that will respond rapidly to changes of input and that can follow such To in either direction. In principle, each analog to digital converter may comprise a comparator and trigger circuit for each of the output digits. Each comparator compares the input analog signal with a suitable reference voltage to detect each shift in value of the digit. Each comparator circuit output typically represents the digit value 0 if the input signal is less than the reference voltage, and represents the digit value 1 if the input signal is greater than the reference voltage.

The digit of highest numerical significance changes value only once as the input runs through its full range. Therefore a constant reference voltage is sufficient for controlling the comparator circuit for that digit. For the digits of less than greatest significance the digit valve changes at a plurality of valves of the input signal, and it is necessary either to switch the reference voltage supplied to the comparator circuit or to modify the input signal proportionally and switch the degree of that modification. A system of the latter type for two binary digits is shown illustratively in block form in FIG. 2.

In FIG. 2 the comparator and trigger circuits for the respective digits $d1$ and $d2$ are indicated at T1 and T2 with power inputs shown illustratively as +24 volts and ground. Each comparator and trigger circuit may comprise a monostable trigger circuit or high gain differential amplifier, and includes circuitry, not explicitly shown, for developing a constant reference voltage, which may be the same for both circuits.

The signal E1 for control of comparator T1 is derived from deceleration signal $Ea$ by the voltage divider comprising the resistances R1 and R2. E1 then varies with $Ea$ as shown schematically in FIG. 3. The resistances are selected to cause E1 to cross the reference voltage $Ev$ at the midpoint of its normal range, which thus constitutes a control threshold and is indicated by the numeral 2 in FIG. 3. As $Ea$ passes that threshold value, comparator T1 switches its output, typically from ground potential, representing digit value 0, to a positive voltage, representing digit valve 1. With decreasing input signal, the comparator circuit abruptly shifts the output in the opposite direction, typically at a somewhat lower threshold. Such hysteresis in the action of the analog to digital converter is not objectionable, tending to increase stability of the system by insuring recovery from an incipient skid before terminating brake relief.

Figure 3:
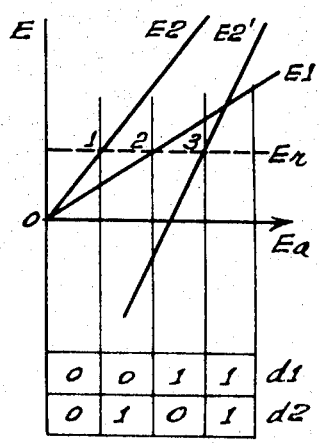
FIG. 3 is a graph illustrating operation of the analog to digital converter of FIG. 2.

Comparator T2 for the digit of lower numerical significance is supplied with an input voltage E2 derived from $Ea$ via the voltage divider R3, R4 and R5, series connected between line 26 and a source of negative voltage, shown as −15 volts. E2 is taken from the junction of R3 and R4. The junction of R4 and R5 is connected to ground via the switch $Sw$, which is shiftable between open and closed conditions by a control signal derived from the output of comparator T1 for the other digit. Switch $Sw$ typically comprises the transistor Q4 of pnp type with its base connected to the output of T1 with suitable biasing and current limiting resistances, and with its emitter connected to ground and its collector to the junction of R4 and R5. The transistor is then conductive in normal condition of the system (0 value of $d1$) and is cut off when $d1$ shifts to value 1. R3 and R4 are selected to make E2 equal reference voltage $Er$ at threshold 1 of E2 when switch $Sw$ is effectively closed, as shown by the line E2 in FIG. 3. R5 is selected to make E2 equal reference voltage $Er$ at threshold 3 of $Ea$ when $Sw$ is open, as shown by the line E2'. Hence, as $Ea$ increases from zero through its range, digit $d2$ initially has the value 0, is shifted at threshold 1 to value 1 by action of T2, is shifted back to value 0 at threshold 2 by rapid sequential action of T1, $Sw$ and T2, and is again shifted to value 1 at threshold 3 by action of T2. The resulting code configuration of $d1$ and $d2$ is as shown at the bottom of FIG. 3, in agreement with Table 1, above.

An advantage of the described type of analog to digital converter circuit is that the output may be shaped, if desired, to introduce a selected degree of nonlinearity between the analog input and the digital output. That is, the mutual spacings of the threshold values 1, 2 and 3 which separate the ranges of the input that correspond to respective output digital configurations can be varied as desired by suitable selection of the resistance values of R1 through R5. However, the linear distribution shown in FIG. 3 is ordinarily preferred.

Skid Control Valve. FIG. 4 shows schematically illustrative structure for skid control valve 36. The housing 80 encloses an elongated, generally cylindrical space which comprises the piston chamber 81 at its upper end, as shown, containing the dual piston 82; the intermediate spring chamber 83 enclosing the spring 84; and the lower valve chamber 85, containing the poppet valve 86 and with output connected via conduit 15 to the brake. Poppet 86 has an axial through bore 93 and is freely slidable axially, with the seal 87 between it and the chamber wall. It is lightly biased upwards by the spring 88, tending to close the valve 89 between supply conduit 35 and brake conduit 15. The upper end of poppet 86 is engaged by the valve plate 90, forming the valve 91 which controls flow between return conduit 39 and brake conduit 15 via poppet bore 93. The valve acts as a conventional metering valve to maintain the output brake pressure $Pb$ in conduit 15 directly proportional to the downward force $Fs$ exerted by spring 84 on valve plate 90. That force is developed by piston 82, which engages the upper seat 92 of the spring.

Piston 82 comprises an annular lower portion working in lower chamber 81a and an upper portion working in chamber 81b, the effective working areas of the two piston portions being A1 and A2. Pressure in chamber 81a is controlled by the solenoid valve $v1$, that in chamber 81b by the valve $v2$. In normal position of each valve, as shown, the piston chamber is connected to the control pressure $Pc$ supplied via conduit 44. That pressure then acts on both piston areas A1 and A2, producing a brake pressure $Pb$ directly proportional to $Pc$, and equal to $Pc$ under the typical condition that the area $Av$ of valve 91 equals A1 + A2. Energization of valve solenoid $s1$ or $s2$ in response to a digital signal on line 27 or 29, representing value 1 of digit $d1$ or $d2$, shifts the corresponding valve $v1$ or $v2$ to the left as seen in FIG. 4. The corresponding portion of piston chamber 81 is thereby isolated from control conduit 44 and is connected instead via the housing passage 95 and spring chamber 83 to the reference pressure in return conduit 39, reducing essentially to zero the contribution of that piston area to the force exerted on spring 84. Poppet valve 86 responds by producing a corresponding stepwise change in output pressure $Pb$.

Under normal conditions, with both solenoids idle, the spring force $Fs$ is given by $$Fs = PbAv = Pc(A1+A2) \qquad (1)$$

where $Av$ is the area of valve plate 90 enclosed by valve 91. The brake pressure is therefore $$Pb = \frac{A1+A2}{Av} Pc \qquad (2)$$

During skid control action equation (2) is modified by setting A1 or A2 or both equal to zero, according to the control step that is in effect. If the solenoids should be disabled by loss of power or other malfunction, full braking pressure is made available.

In accordance with the present invention, the areas A1 and A2 are normally selected to correspond in ratio to the numerical significance of the respective digits $d1$ and $d2$. Thus, in the case of binary digits, A2 is normally one-half of A1. The steps of progressive brake relief provided by the present digital system are then typically as follows:

TABLE 2

| Step: | d1 | d2 | Pb |
|---|---|---|---|
| 0 | 0 | 0 | Pc |
| 1 | 0 | 1 | 2Pc/3 |
| 2 | 1 | 0 | Pc/3 |
| 3 | 1 | 1 | 0 |

That linear variation of $Pb$ over the steps of brake relief can be modified, if desired, by different selection of the piston areas, while still retaining the advantage of providing a number of steps that is larger than the number of control elements. For example, if A1 is one-third A2 the brake pressures during the first and second steps of brake relief are $3Pc/4$ and $Pc/4$, respectively, making the first step of brake relief smaller and the second step larger than for the linear relation of table 2.

Adaptive Control System

Vehicle Deceleration Signal. FIG. 5 is a schematic diagram showing further illustrative detail of adaptive control system 30 of FIG. 1, using the same numerals for corresponding parts. The positive wheel speed signals $Ev$ from the individual wheels are supplied via the respective lines 46a through 46d to input circuit 48. The diodes CR1 through CR4 in the respective lines select the largest of the input signals for transmission to the line 49. The shunt filter capacitance C4 limits the positive signal on line 49, typically to from two to 10 times the maximum normal rate of deceleration of the vehicle.

The resulting vehicle velocity signal EV on line 49 is differentiated by circuit 58. That circuit typically comprises the capacitance C5, connected via the summing resistance R26 and the line 122 to the operational amplifier M5 with negative feedback circuit via the parallel-connected resistance R27 and capacitance C6. Amplifier M5 produces on its output line 65 a positive signal that represents the vehicle deceleration. For convenience of description, the designation EA will be used for that deceleration signal and also for modified signals to be derived from it.

The line 70 taps a definite fraction of vehicle deceleration signal EA from the voltage divider R20, R21 for supply to the differentiating circuit of the skid control system 10 for each wheel, as already described. Line 70 is also shunted to ground via the zener diode CR10, which limits the tapped signal to a selected maximum value, typically corresponding to the maximum practicable rate of actual vehicle deceleration.

The vehicle deceleration signal EA on line 65 is shaped and amplified by circuitry which includes the isolating and amplifying transistors Q1 and Q2. Resistance R22 and capacitance C9 form an integrating circuit, which limits the rate at which the signal at the base of Q1 can vary, while diode CR11 prevents that signal from becoming negative. Q2 inverts the signal and is so biased that the final analog reprensentation on output line 60 has a definite range of variation, reaching its maximum positive value for zero vehicle deceleration and decreasing to zero as the vehicle deceleration increases to a selected maximum rate, which typically represents normal rapid braking.

Analog to Digital Converter. Analog to digital converter 66, as shown illustratively in FIG. 5, employs the same principle of operation as converter 28, already described in connection with FIG. 2. In fact, the circuitry for supplying suitable input signals E1 and E2 to the comparator and trigger circuits T1 and T2 for the two digits of greatest significance is essentially the same as that of converter 28. As in that system, R1 and R2 are selected to make E1 equal the reference voltage $Er$ at the midpoint of the range of variation of input signal EA; R3 and R4 are selected to make E2 equal $Er$ when switch Sw is closed and Ea has one-fourth its maximum value; and R5 is selected to make E2 equal $Er$ when switch Sw is open in response to the positive output signal from T1 and EA has three-fourths its maximum value.

The digital signal for the third binary digit D3 is developed by the comparator and trigger circuit T3 in response to the input signal E3. The latter signal is derived from a voltage divider that includes the resistances R6, R7 and R5. Switch Sw shifts the action of that divider at the same time, and in the same way, that it shifts the divider R4 and R5 for digit D2. However, for D3 the additional resistances R8 and R9 are series connected between the junction of R6 and R7 and a source of negative voltage, and the switch $Sw2$ is connected between ground and the junction of R8 and R9. $Sw2$ is controlled by the output signal from T2 in such a way that the switch is closed when D2 has value 0 and is open when D2 is shifted to value 1. With suitable selection of R8 and R9 with respect to the other resistance values, E3 a can be made equal to the reference voltage at the proper threshold values of input signal EA.

The output from each comparator and trigger is amplified by the corresponding power amplifier M1, M2 or M3 and supplied via a line 67, 68 or 69 to the appropriate valve actuating solenoid S1, S2 or S3 of the adaptive control valve portion of master control valve 34. As in the skid control systems 10, each solenoid is energized in response to value 1 of its digit and is idled by digit value 0. However, in normal condition of the present system, in absence of braking action, all solenoids are energized, limiting or reducing the available brake pressure. Progressively increasing vehicle deceleration causes stepwise idling of the solenoids in accordance with the selected digital code, increasing the available brake pressure until full pressure is available as the vehicle deceleration reaches a value corresponding to normal road friction. That arrangement has the advantage that loss of power or other malfunction disabling the solenoids insures availability of full braking pressure.

Functional Modifications. The adaptive control system of FIG. 5, as so far described, may be modified in many ways to make its action meet additional requirements of various sorts. Two examples of such modification, which have already been mentioned in connection with FIG. 1, are embodied in illustrative form in FIG. 5. One type of modification makes the pressure limitation more severe in response to numerous or repeated skid control actions. The other overrides the above described system when the vehicle is stationary, making available full brake pressure under that condition.

Referring to FIGS. 1 and 2, a skid signal $Es$ is developed on a line 52 in response to each skid control action of an individual wheel system 10, typically from the digital skid signals that are transmitted on lines 27 and 29 to the valve solenoids $s1$ and $s2$ of each skid control valve 36. As shown illustratively in FIG. 2, line 27 for digit $d1$ is connected to output line 52 via the diode CR6 and the resistance R16, while line 29 for digit $d2$ is similarly connected via CR7 and R17. During skid control action one or both of lines 27 and 29 is raised to a positive voltage, supplying to line 52 a current signal that is determined primarily by the series resistance. That resistance value is preferably selected in accordance with the numerical significance of the digit, so that the total current delivered to line 52 will accord generally with the intensity of the skid signal. For example, in the present binary system R16 is typically about one-half of R17. The diodes prevent crosstalk between lines 27 and 29.

After delivery via the lines 52a through 52d to input circuit 50 of the adaptive control system 30 (FIG. 1), the individual skid signals Es are summed to give a combined skid signal ES on the line 53 (FIG. 5), summing resistors being unnecessary since the signals comprise currents rather than voltages. Output line 53 is shunted to ground by the parallel connected resistor R18 and capacitor C8 which effectively integrate the current signals, converting them to a voltage signal. The rate of increase of that voltage signal is determined primarily by the relatively short time constant of C8 and the series resistances, such as R16 and R17, at the individual wheel systems (FIG. 2). The rate of decay of the voltage signal is determined by the time constant of C8 and R18, which is typically longer, so that, after a series of abnormally intense skids, the available brake pressure is returned to normal only gradually. A time constant of the order of 0.5 to 2 seconds is usually satisfactory.

As shown in FIG. 5, the skid signal on line 53 is supplied via the summing resistance R19 to line 122 at the input of operational amplifier M5, where the vehicle deceleration is represented by a negative-going signal. The positive voltage of the skid signal therefore opposes the vehicle deceleration, reducing the magnitude of the final vehicle deceleration signal and additionally restricting the available brake pressure. The exact functional relation between the skid action and the final adaptive action of the system can be varied widely by selection of circuit components and other factors to accord with the particular requirements of the vehicle and the expected operating conditions.

To insure availability of full braking pressure when the vehicle is stationary, the present system effectively disables the adaptive control under that condition. As an illustration of the many ways in which that might be accomplished, the circuit of FIG. 5 applies a disabling voltage signal via line 63 to the base of transistor Q2 in absence of a vehicle velocity signal EV at line 49, the transistor Q3 acting essentially as a switch for the disabling signal. During normal vehicle operation, Q3 is held fully conductive by supply of signal EV from line 49 to the transistor base, drawing current through the collector resistance R29 and holding the collector terminal close to ground potential, emitter resistance R28 being small. Diode CR12 then effectively isolates output line 63, and the adaptive control circuit operates as already described. When the vehicle stops, the control signal on line 61 decays to zero, cutting off Q3. The base of Q2 then receives essentially the full positive supply voltage, simulating a maximum vehicle deceleration signal and driving output line 60 to its minimum potential, typically zero. Under that condition the adaptive control is effectively disabled, since it makes full braking pressure available to the brakes.

In case of a simultaneous skid of all wheels, the abrupt decrease in the vehicle velocity signal on line 61 is blocked by the diode CR5, and Q3 is maintained conductive during discharge of C10 through R30 and the base-emitter circuit of the transistor. The time constant for that discharge is selected to maintain normal adaptive control action throughout any simultaneous skid of all wheels. Transistor Q3 acts essentially as a switch, but is preferably biased to give a somewhat gradual transition between conductive and cutoff conditions so that the shifts of braking action are not noticeable to the operator or passengers of the vehicle.

Adaptive Control Valve I. FIG. 6 shows schematically a preferred form of master control and pressure regulating valve 34 for use in the adaptive control system of the present invention. As already described in connection with FIG. 1, valve 34 is supplied with digital control signals for the three binary digits D1, D2 and D3 over lines 67, 68 and 69, receives hydraulic fluid at supply pressure P via conduit 33, returns fluid at return pressure R via conduit 38, and produces as output a control pressure Pc in conduit 44 for supply to the relay valves 36 of the respective skid control systems 10. Valve 34 comprises the housing assembly 140 with command section 142 and control section 144. In practice, housing 140 would, of course, be divided into many more demountable sections to facilitate valve assembly, such practical features of the structure being omitted here and in other FIGS. for clarity of illustration.

Command section 142 of the valve housing forms the coaxial cylindrical valve chamber 143 and piston chamber 160. The valve spool 146 with the circumferential channel 147 is freely slidable in valve chamber 143. Annular channels 148 and 149 in the chamber wall are supplied respectively with fluid under supply pressure P via the passage 151 from conduit 33 and with return pressure R via the passage 152 from conduit 38. The housing passage 153 receives the intermediate pressure Pi developed in spool channel 147. In equilibrium position of valve spool 146, as shown, its channel 147 is isolated from both supply and return pressures. Slight movement of the spool to the left as seen in FIG. 6 admits supply pressure, while slight opposite movement exhausts fluid to return pressure. Fluid pressure on the spool end faces is equalized by the axial through bore 157, which is typically connected to return pressure. Hence the spool position is determined entirely by the balance of forces exerted on it by the light spring 154 at the pressure end and by plunger 156 at the exhaust end.

Plunger 156 is mounted on the piston 158 which slides freely in piston chamber 160 with suitable fluid seals. The annular piston face surrounding plunger 156, with area designated Ao, is continuously subjected to the output pressure Pc for the entire valve, supplied via the external conduit 162 and housing passage 163. Piston 158 is yieldably urged against that fluid pressure by the coil spring 164, which is compressed under control of the brake command signal. That command signal typically comprises a Fo applied to the spring via the slider 166 by the vehicle operator, using a conventional brake pedal 40 or similar device (FIG. 1). Alternatively, the command force may be applied hydraulically to piston 158, as by a command fluid pressure developed in any suitable manner and supplied to piston chamber 160 outward of the piston. The pressure Pi metered to passage 153 is normally raised or lowered by the valve action until the opposing forces on piston 158 are equal (the light force of spring 154 being neglected for clarity of discussion). For such equilibrium, $$Pc = Fo/Ao \qquad (3)$$

Control section 144 of the valve housing contains the coaxial piston chamber 170 and valve chamber 180. Chamber 170 contains the freely movable compound piston 176 which has three distinct piston faces with respective working areas A1, A2 and A3 operating in respective separate chamber portions 171, 172 and 173 in which pressures are controlled by the respective solenoid valves V1, V2 and V3. Piston 176 also has a fourth working face of area Ai working in its own chamber portion 174. Intermediate pressure Pi is supplied from command metering valve 146 via passage 153 directly to the latter chamber, and also to one side of each of the solenoid valves V1, V2 and V3, which are controlled by the solenoids S1, S2 and S3 in response to the digital code signals supplied via the lines 67, 68 and 69. The solenoid valves are supplied on their other sides with return pressure R via the conduit 152.

With the solenoids idle, in response to value 0 of their respective digits, the valves are in the normal position shown in FIG. 6, transmitting Pi to the respective portions 171, 172 and 173 of the piston chamber. Under that condition the entire upper surface of piston 176, comprising areas A1, A2, A3 and Ai, is exposed to fluid at pressure Pi. Energization of a solenoid, in response to shift of its digit value to 1, removes that pressure from the corresponding piston area and substitutes return pressure R, which may be considered zero. With all solenoids energized, the effective upper area of the piston is reduced to Ai.

Valve chamber 180 contains the valve spool 182 with circumferential channel 184. Supply and return channels 186 and 188 in the chamber wall cooperate with channel 184, essentially as already described for valve 146, to produce the regulated output pressure Pc in channel 184. That pressure is supplied via the axial bore 190 to both ends of spool 182, equalizing the fluid forces on that spool, and also to the entire lower surface of compound piston 176. The valve spool is supported at its lower end by the light spring 196, and is coupled to piston 176 by the spring 194. The valve maintains the output pressure Pc just sufficient to support compound piston 176 against the combined fluid pressures acting on its upper surfaces.

Representing the area of the lower face of piston 194 by $Ac = A1 + A2 + A3 + Ai$, the condition for piston equilibrium may be written $$PcAc = Pi(Ad + Ai) \qquad (4)$$

where $Ad$ represents the combined areas of those piston faces A1, A2 and A3 for which the control solenoids are deenergized (digit value 0).

Under normal conditions of operation, when the operator commands only light or moderate braking pressures, the described valve system produces an intermediate pressure Pi such that equation (3) and equation (4) are both satisfied. Pc is then determined by equation (3), as by a conventional metering valve, and equation (4) may be considered to determine only the intermediate pressure Pi.

However, the value of Pi cannot exceed the limited source pressure P. Substitution of P for Pi in equation (4) gives the maximum limit Pcm to which Pc can rise for each value of $Ad$, that is, for each one of the control steps of the present digital adaptive control system. If the command force Fo corresponds, by equation (3), to a value of Pc higher than that limit, the actual value of Pc is simply unable to balance the imposed command force. Piston 158 is then driven inward to the limit of its travel, set by the stop formations 159. Valve 146 is thereby held open to supply pressure P, maintaining Pi at its maximum value P. Valve 182 holds Pc at the corresponding maximum value Pcm given by $$Pcm = P(Ad + Ai)/Ac \qquad (4')$$

During such operation any change in the vehicle deceleration signal EA will cause a corresponding change in solenoid energization, shifting the value of $Ad$ and thereby raising or lowering the maximum control pressure Pcm that can be made available to the brakes.

For low values of EA for which all solenoids are energized, $Ad$ is zero and equation (4') becomes $$Pcm = P(Ai/Ac) \qquad (5)$$

The value of $Ai$ may be selected arbitrarily to give the desired minimum available control pressure at the initiation of braking. When EA is large, as during rapid normal braking, all solenoids are deenergized. $Ad + Ai$ is then equal to $Ac$ and $$Pcm = P \qquad (6)$$

For intermediate values of EA, leading to intermediate digital signal patterns, equation (4') gives respective definite values for Pcm. For a binary digital code it is usually preferred that $$A1 = 2A2 = 4A3 \qquad (7)$$

If we then assume for illustration that $Ai = 0.3Ac$ and $A1 = 0.4Ac$, the eight control steps, including (5) and (6), provide the uniformly distributed limiting values $$Pcm = 0.3P,\ 0.4P,\ 0.5P, -0.9P \text{ and } 1.0P \qquad (8)$$

Under normal braking requirements and with normal pavement conditions the gradual increase of braking pressure ordinarily commanded by the operator typically results in sufficient vehicle deceleration to maintain the maximum available pressure Pcm above the brake pressure that is commanded, so that the adaptive control system imposes no actual pressure limitation. However, if the rate of vehicle deceleration is limited by abnormal pavement conditions, the available brake pressure is held down correspondingly, reducing the possiblity of an actual skid and facilitating effective skid control.

Adaptive Control Valve II. FIG. 7 corresponds to the upper portion of FIG. 6 and represents a modified master control valve 34a which produces a different relationship between the command force Fo and the control brake pressure Pc that is made available to the brakes. In FIG. 7 the command force Fo is applied directly to the valve spool 146a, without being partially or wholly balanced by the command pressure, as by the action of piston 158 of FIG. 6. Hence that piston, passage 163 and conduit 162 are omitted in FIG. 7. The command force is balanced, instead, by the intermediate pressure Pi acting on the farther end of the slide valve 146a. For that purpose the axial through bore 157 in valve spool 146 of FIG. 6 is separated in FIG. 7 into a left portion 157a, which supplies Pi from spool channel 147 to the left end of valve cylinder 143, and a right portion 157b, which admits return pressure R from channel 149 to the right end of the valve cylinder. The portion of valve 34a that is not shown in FIG. 7 or mentioned above may be identical with FIG. 6.

In operation of the master control valve of FIG. 7, the intermediate pressure Pi supplied to passage 153 satisfies the equation $$Pi = Fo/Ao \qquad (9)$$

where $Ao$ represents the effective piston area of the left end of valve spool 146a. Equation (9) takes the place of equation (3) of the modification shown in FIG. 6. The previous equation (4) applies without change to both types of valve. Substituting from equation (9) into equation (4) gives $$Pc = (Fo/Ao)(Ad + Ai)/Ac \qquad (10)$$

From equations (9) and (10) it will be seen that the intermediate pressure Pi in the master control valve of FIG. 7 corresponds directly to the brake pressure produced by a conventional metering valve in response to a command force Fo; and that the output pressure Pc is always a definite fraction of that normal brake pressure, the fraction varying in accordance with the digital signal supplied to the valve solenoids. Using for illustration the same assumed piston areas that led to equation (8), that fraction varies in steps of 0.1 from the value 0.3, for all solenoids energized, to 1.0, for all solenoids deenergized.

In design of a valve such as that of FIG. 7, $Ai$ is made large enough to insure that when the brakes are first applied with $Ad = o$, the available brake pressure Pc will decelerate the vehicle fast enough under normal road conditions to initiate deenergization of the valve solenoids S1, S2, and S3. A cumulative action is thereby initiated by which, for uniform command force Fo, each increment in the digital vehicle deceleration signal increases the available brake pressure Pc, and each increase in the available brake pressure increases the vehicle deceleration signal. Under normal road conditions the available pressure Pc is thereby rapidly built up to the full value that corresponds to the command signal Fo. However, if skidding should occur, so that the vehicle deceleration is less than normal, or so that a large skid signal is supplied to circuit 50 of FIG. 5, the available pressure is held to a corresponding fraction of that commanded.

It will be recognized that the structure of FIG. 7 may be considered to comprise a metering valve such as is conventionally used to transform a command force into a corresponding pressure for supply to the brakes, combined with a digitally controlled valve which modifies the pressure produced by the metering valve. It is usually convenient to mount those two valve structures in a common housing, as shown, but they may be entirely separate and remotely mounted if preferred. That is true also of the valve sections of FIG. 6, except that the additional conduit connection 162 is required for feedback of the final output pressure Pc to the first valve stage.

The functional operation described in connection with FIG. 7 can be obtained with valve structure essentially as shown in FIG. 6, but with means for supplying to piston chamber 160 the intermediate pressure $Pi$ in place of the control pressure Pc, and with suitable modification of piston diameters. For example, passage 163 of FIG. 6 may lead to a three-way valve by which it may be connected selectively either to conduit 162 or to a source of $Pi$ such Pc as passage 153. The functional action of the valve can then be switched between that described for FIG. 6 and that described for FIG. 7.

Adaptive Control Valve III. A further illustrative form of master control valve in accordance with the invention is represented in FIG. 8, the conduits, solenoids and solenoid controlled valves being shown in highly schematic form for clarity of illustration. The housing 200 contains the cylindrical valve chamber 202 with the axially slidable valve spool 204. The command force Fo is applied to the left end of valve spool 204, as seen in FIG. 8, via the spring 206 and the plunger 208. Fluid at supply pressure P is supplied from conduit 33 to the valve channel 209 and at return pressure R from conduit 38 to the valve channel 210. Channel 205 of the valve spool is connected to output conduit 44, producing the valve output pressure Pc. The right end of valve spool 204 is engaged by the compound piston 212, which works in the multiple cylindrical chamber 213. The piston has four piston surfaces facing to the right with respective areas A1, A2, A3 and Ao, and a single piston surface facing to the left with area Ac equal to the sum of the four right-facing surfaces. The output pressure Pc from valve 204 is supplied directly via the conduit 214 to the chamber for piston face Ao, and is supplied via the solenoid valves V1, V2 and V3 to the respective chambers for faces A1, A2 and A3 when the solenoids S1, S2 and S3 are energized. Solenoid deenergization replaces Pc by return pressure R, which may be considered zero. Return pressure is also supplied via channel 210 and the axial spool passage 203 to both ends of the valve spool and to piston surface Ac. In an actual structure valve spool 204 may be coupled to plunger 206 and to piston 212 by damping springs, such usual practical features being omitted in the FIG. for clarity of illustration.

In response to a command force Fo, the valve of FIG. 8 produces a control pressure Pc available for braking in accordance with the equation $$Pc = Fo/(Ad + Ao) \quad (11)$$

where Ad has the same meaning as in equation (4) above. When all control valves V1, V2 and V3 are supplying return pressure to their respective piston faces, equation (11) becomes Pc = Fo/Ao, which corresponds to the action of a conventional metering valve. As the control valves are progressively shifted to supply Pc to their piston surfaces, Pc decreases by definite fractional increments to the minimum value Pc = Fo/(A1+A2+A3+Ao). Those increments, however, are not linear as in the valve of FIG. 7, but follow a hyperbolic curve. The nature of that curve and its minimum value are variable within wide limits by selection of dimensions.

Adaptive Control Valve IV. FIG. 9 represents schematically an adaptive control valve generally similar in function to the valve of FIG. 6, but operating in a different manner. The housing 220 contains at its lower end, as seen in the drawing, a pressure metering valve which may be constructed like valve 146a of FIG. 7, but is shown illustratively as a poppet valve and with numerals corresponding to those of valve 86 of FIG. 4. The description already given of the operation of the latter valve will not be repeated. It is noted, however, that in the present valve supply pressure P enters from conduit 33 and return pressure R from conduit 38. Valve 86 of FIG. 9 delivers to conduit 44 a control pressure Pc such that the downward force Fi exerted by spring 84 is balanced by the upward force of Pc acting on the effective valve area Av.

The force Fi is applied to the upper seat 92 of spring 84 by the pushrod 224, which slides freely in sealed relation in a bore in the housing web 221 and also in a coaxial bore in the multiple piston 230. The upper end of pushrod 224 carries the piston 226 which works in the cylinder 228 and has its upper face exposed to fluid under the command pressure Pm supplied via the conduit 227. Pressure Pm is typically developed in response to an applied command force by a conventional metering valve, not explicitly shown. Alternatively, the command force may be applied mechanically from the brake pedal or the like to pushrod 224. Pushrod 224 carries the collar 225 in a position, which may be axially adjustable, to engage the upper end of piston 230 and limit downward movement of the pushrod, thereby limiting the degree to which valve spring 84 can be compressed. That stop action limits the spring force that can be applied to the valve, and hence limits the output pressure Pc, the degree of limitation varying with the position of piston 230.

Multiple piston 230 has separate upwardly facing piston surfaces of respective areas A1, A2 and A3 operating in distinct cylinder portions in which the fluid pressure is controlled by the respective solenoid valves S1, S2 and S3, all in the manner already familiar. The valve solenoids are normally all energized, connecting their respective cylinder portions to return pressure R via the conduit 232. Solenoid deenergization substitutes supply pressure P received from conduit 234. The lower face of piston 230 is exposed continuously to return pressure R supplied from conduit 38 via the valve spring chamber and the clearance opening 237 in housing web 235. Piston 230 is urged upward by the spring 236 against the positive stops 238, which may comprise adjustable screws with suitable locking and sealing means. The respective piston areas are typically related to each other by factors of two, as in the previously described structures, but are larger relative to other piston areas of the present valve. Stop spring 236 has a coefficient K which is correspondingly larger than the coefficient k of valve spring 84, the ratio being typically from about 3 to about 10.

In operation of the valve of FIG. 9, during normal driving conditions piston 230 has all piston faces exposed to return pressure R and is therefore held by stop spring 236 at the upper end of its travel against stops 238. Upon brake application, command pressure Pm drives piston 226 and pushrod 224 downward, compressing valve spring 84 and producing in output conduit 44 a control pressure Pc that initially corresponds to the full command signal and typically equals Pm if valve area Av equals the area of piston 226. In absence of a digital signal to the valve solenoids, the pushrod can move only the selected clearance distance Do before collar 225 engages multiple piston 230, stopping the movement effectively positively due to the relatively large force required to compress spring 236. That stop action temporarily limits the output pressure Pcm to a maximum value Pcm such that $$PcmAv = Fi = kDo \quad (12)$$

Under normal road conditions that initial brake application produces a corresponding vehicle deceleration, resulting in an electrical vehicle deceleration signal EA in the adaptive control system, typically shown in FIG. 5. A corresponding digital signal is delivered to one or more of the solenoid valves S1, S2 and S3, causing the supply pressure P to be applied to a definite corresponding portion Ad of the total piston area. Piston 230 is thereby driven downward against the force of stop spring 236 a distance D such that $$D = PAd/K \quad (13)$$

neglecting any initial stressing of spring 236. Equation (12) is thereby altered to $$PcmAv = k(Do+D) \quad (14)$$

It is usually preferred to select the dimensions and constants so that at the last step of digital control, when $Ad = A1 + A2 + A3$, the output pressure $Pc$ is no longer limited, but can equal the supply pressure $P$. Substituting those values in equations (13) (14) gives the relation $$(A1+A2+A3)/K = Av/k - Do/P \quad (15)$$

With that illustrative selection of constants, the limiting value Pcm ordinarily increases fast enough in response to the stepwise increase of $Ad$ as the brakes are applied so that the actual output pressure $Pc$ can keep pace with a normally increasing command signal. In presence of actual or incipient skidding, however, the described limitation of available pressure typically becomes effective and facilitates skid control.

By selecting spring constants $K$ and $k$ having a ratio near the lower end of the range defined above, the above described limitation upon the available control pressure $Pc$ can be made somewhat flexible. The operator can then override the limiting action to a certain extent by applying abnormally heavy force to the brake pedal. Whereas the possibility of such action may be reassuring to the operator, it does not ordinarily produce more effective braking. That is especially true during an emergency stop, when some drivers may tend to apply the brakes so strongly as to produce severe skidding. The adaptive control of the present invention is particularly valuable in counteracting such action, and it is ordinarily preferred to design the spring ratio high enough to insure effectiveness of the described pressure limitation.

Adaptive Control Valve V. FIG. 10 represents schematically a further illustrative valve structure for variably limiting the maximum value of the control pressure $Pc$ under control of a digital signal. The metering valve 86 at the lower end of the housing 240 is typically similar to valve 86 of FIG. 9 and operates in the same manner, except that the control force $Fi$ is transmitted to valve plate 90 from valve spring 84a via the rod 242 which slides in sealed relation in the housing web 244. Spring 84a in FIG. 10 is compressed by the piston 246, which works in the cylinder 248 and directly engages the upper end of the spring. Piston 246 is urged downwardly by fluid admitted to the upper end of cylinder 248 from conduit 227 under the command pressure $Pm$, corresponding in that respect to piston 226 of FIG. 9. Cylinder 248 below piston 246 is filled with an essentially incompressible liquid, such as hydraulic fluid, for example. Downward movement of the piston is limited by trapping that liquid below a selected level, determinded by valvular control of the multiple connections 250 between cylinder 248 and the conduit 252. That conduit acts alternatively as source or sump for fluid at a definite reference pressure, typically return pressure R for the entire brake system. The uppermost connection 250a is continuously open, permitting unrestricted piston movement above that level. Each connection 250b through 250h is controlled by one or more of the seven solenoid controlled valves V1 through V3d, which are ganged in the manner indicated, so that V1 is closed by energization of solenoid S1, V2a and V2b are closed by energization of S2, and V3a, V3b, V3c and V3d are closed by energization of S3. The pattern of valve connections is such that the length of cylinder 248 that is made available for free piston movement corresponds to the code signals supplied to the three solenoids. Although connections 250a through 250h form a linear distribution as shown in FIG. 10, they may be arranged nonlinearly to make the successive steps nonuniform in any desired manner. Within the portion of cylinder 248 above the lowest open connection, piston 246 responds freely to input pressure $Pm$, and valve 86 acts as a conventional relay valve to maintain the output pressure $Pc$ proportional or equal to $Pm$. But the closed portion of cylinder 248 below the lowest open connection acts as a positive stop for the piston, limiting the maximum value of $Pc$. That limitation may be moderated, if desired, as by providing one or more further connections such as 254, each with or without valve control and with a small orifice 255 which permits piston movement at a limited rate.

System Modifications

The preceding description has assumed for clarity that control pressure $Pc$ is developed by a single adaptive control valve, such as 34, and is distributed in parallel to each of the wheel brakes via relay action of individual skid control valves, such as 36. Alternatively, each wheel, or each group of wheels, may be provided with its own adaptive control valve, the digital signals on lines 67, 68 and 69 and the command signal being supplied in parallel to all of those valves. The adaptive control valve and skid control valve for each wheel may then be integrated to any desired extent.

For example, if a command pressure $Pm$ is developed by a conventional metering valve, both adaptive and skid control modulation of $Pm$ may be produced at each wheel by a single valve structure operating in accordance with any of the principles of operation that have been described and under control of a digital signal which is developed by combining the electronic skid control and adaptive control signals of FIG. 1. Distinctive features of such a system are represented schematically in FIG. 11.

In FIG. 11 the electronic circuitry for developing a digital skid control signal for each wheel on lines 27 and 29 and for developing a digital adaptive control signal on lines 67, 68 and 69 is assumed to be essentially as in FIGS. 1, 2 and 5, and is shown only in fragmentary form. Those two sets of digital signals are combined by circuitry for each wheel, indicated schematically at 274 and typically comprising a digital adding system of conventional type. The resulting combined digital signal is supplied via the four lines 276 to the combined function valve 270, which performs both skid control and adaptive control functions. Alternatively, the skid control signal $Ea$ for each wheel and the adaptive control signal $EA$ may be summed while still in analog form, and the resulting combined analog signal for each wheel then converted to digital form by a single analog to digital converter for each wheel, from which the resulting digital signal is supplied to valve 270 for that wheel. The output of valve 270 is a final brake pressure $Pb$, which is supplied via the conduit 15 to the brake for an individual wheel. The initial command signal from brake pedal 40 is converted to pressure form by the metering valve indicated schematically at 272 and is delivered as command pressure $Pm$ to all valves 270 in parallel via the branched conduit 44. The functions performed by the adaptive control valve shown in FIGS. 6 or 7, for example, are thus divided in FIG. 11 between the single metering valve 272 and the several valves 270 for the respective wheels.

Each combined function valve 270 in FIG. 11 is typically similar to the structure enclosed by housing portion 144 in FIG. 6, with command pressure $Pm$ supplied from conduit 44 of FIG. 11 to housing passage 153 and with passages 151 and 152 plugged at their upper ends. Since the valve performs skid control as well as adaptive control functions, it is usually preferred that the output pressure at conduit 44 be variable all the way to zero. Therefore the portion 174 of piston chamber 170 and the corresponding piston surface of area $Ai$ shown in FIG. 6 may be omitted entirely; or an additional valve V4 may be inserted in the portion of passage 153 serving that cylinder portion and controlled by a solenoid S4 which is responsive in FIG. 11 to a digital signal for a fourth digit D4, supplied from adder 274 on one of the lines 276. The valve 270 will then produce an output pressure based on input pressure $Pm$ but modified stepwise under control of the combined digital signal in a manner familiar from the preceding description.

For some vehicles useful skid control can be obtained by relieving the brakes of all wheels uniformly in response to a skid condition of any wheel, and systems operating on that principle have been proposed. The system of either FIG. 1 or FIG. 11 can be modified to act in that manner. For example, wheel deceleration signals E*a* for the respective wheels may be developed on lines 26 of FIG. 1 as already described, and then combined by circuitry such as 48 in FIG. 5 before supply to a single analog to digital converter such as 28 (FIGS. 1 and 2). The resulting digital skid signal on lines 27 and 29 is supplied to a single skid control valve such as 36, which receives control pressure P*c* from valve 34, and from which the output pressure P*b* is supplied via conduits such as 15 to all brakes in parallel. Similarly, in FIG. 11 a common analog skid signal for all wheels may be developed as just described and supplied to a single analog to digital converter 28. The resulting digital skid signal is summed at 274 with the digital adaptive control signal for control of a single combined function valve 270. The output pressure P*b* from that valve is supplied in parallel to all brakes. Such systems are more economical, mainly because of the smaller number of control valves required. Many of the above described aspects of the present invention are highly advantageous when incorporated in such simplified systems as well as in the more complete systems previously described, which are generally preferred.

I claim:

1. In a control system for a vehicle wheel brake that is actuated in response to an input hydraulic pressure, said system including means for modulating the brake action in accordance with a predetermined function of a measurable physical quantity; the combination of:

a source of pressurized hydraulic fluid;

command means for producing a variable command signal for initiating brake actuation;

sensing means responsive to said physical quantity and acting to produce an electrical signal that varies continuously as an analog representation of said function;

analog to digital coding means responsive to the electrical signal and acting to produce a plurality of digital code signals which represent the values of respective code digits of different numerical significance and comprise a digital code representation of said function;

valve mechanism connected to the pressure source and responsive to the command signal and to the digital code signals, said valve mechanism acting to produce an output pressure that is variable in response to the command signal and that is variable stepwise in response to the digital code signals in accordance with said digital code representation; and means for supplying to the brake a brake actuating pressure derived from said output pressure.

2. The combination defined in claim 1, and in which said valve mechanism includes:

piston means having a plurality of piston faces acting in distinct cylinder chambers;

individual valves for controlling pressure supply to the chambers in response to the respective digital code signals to exert on the piston faces forces that correspond to the numerical significance of the respective digits; and pressure regulating valve means for producing said output pressure under control of said forces.

3. The combination defined in claim 2, and in which:

said code digits are binary digits; and each of said individual valves is shiftable between two conditions in response to respective values of the associated digital code signal, each valve acting in one condition to supply an operating pressure to the associated piston chamber and acting in the other condition to supply a reference pressure to the associated piston chamber.

4. The combination defined in claim 2, and in which:

said code digits are binary digits;

said command signal has the form of a hydraulic command pressure; and each of said individual valves is shiftable between two conditions in response to respective values of the associated digital code signal, acting in one condition to supply the command pressure to the associated piston chamber, and acting in the other condition to supply a reference pressure to the associated piston chamber.

5. The combination defined in claim 1, and in which said valve mechanism includes:

means normally acting to produce an output pressure that corresponds in magnitude to the command signal; and means responsive to the digital code signals for overriding said normally acting means to reduce the value of the output pressure by a fraction that varies stepwise with said digital code representation.

6. The combination defined in claim 1, and in which said valve mechanism includes:

means normally acting to produce an output pressure that corresponds in magnitude to the command signal; and means responsive to the digital code signals for overriding said normally acting means to limit the maximum value of the output pressure in stepwise dependence upon said digital code representation.

7. The combination defined in claim 1, and in which said valve mechanism includes:

pressure regulating valve means for producing an output pressure that corresponds in magnitude to an applied control force;

means normally acting to develop a force that is variable in response to the command signal and to supply the developed force as control force to the pressure regulating valve means; and means responsive to the digital code signals for variably limiting the maximum value of the force that can be developed and supplied by the normally acting means.

8. The combination defined in claim 1, and in which said valve mechanism comprises:

first pressure regulating valve means acting normally to develop an intermediate fluid pressure under joint control of the command signal and the output pressure;

piston means having a plurality of piston faces working in respective cylinder chambers and corresponding in area to the numerical significance of the respective digits;

and second pressure regulating valve means acting to develop said output pressure under control of the piston means; and said system including means acting to limit the intermediate fluid pressure to a predetermined maximum value and thereby to limit the magnitude of the output pressure for predetermined ranges of variation of the command force and of said electrical signal.

9. The combination defined in claim 1, and in which said valve mechanism comprises:

pressure regulating valve means connected to the fluid source and acting to produce said output pressure in response to an applied control force;

a compressible spring with one end engaging the valve means to apply the control force thereto;

means engaging the other end of the spring and normally movable to compress the same under control of the command signal; and means for limiting compression of the spring under control of the digital code signals.

10. The combination defined in claim 9, and in which said compression limiting means comprise:

piston means coupled to said other end of the spring and movable in a cylinder having a plurality of longitudinally spaced orifices; and valve means controlling flow through the orifices and responsive to the digital code signals to seal a length of the cylinder corresponding to the digital code representation.

11. The combination defined in claim 9, and in which said compression limiting means comprise:

piston means having a plurality of piston faces acting in distinct cylinder chambers;

individual valves for controlling pressure supply to the chambers in response to the respective digital code signals to exert on the piston faces forces that correspond to the numerical significance of the respective digits;

resilient means opposing movement of the piston means in response to said forces and thereby determining an equilibrium position of the piston means for each digital code representation; and stop mechanism for limiting movement of said other end of said spring in accordance with the position of the piston means.

12. In a system for controlling a vehicle wheel brake in response to a continuously variable electrical signal, the combination of:

circuit means responsive to the electrical signal and acting to develop a plurality of digital signals that correspond to respective code digits of different numerical significance and that form a digital code representation of the electrical signal;

a source of pressurized fluid;

pressure regulating valve means connected to the fluid source for developing an output fluid pressure in response to an applied control force;

signal means responsive to each of the digital signals for selectively developing a signal force corresponding in magnitude to the signal and to the numerical significance of the associated digit;

control means acting under joint control of the signal forces for applying a control force to the pressure regulating valve means;

means for operating the vehicle wheel brake in response to the output fluid pressure.

13. The combination defined in claim 12, and in which said signal means comprise:

piston means having respective piston faces working in distinct cylinder chambers and corresponding in area to the numerical significance of the respective digits; and valve means for selectively supplying pressurized fluid to the cylinder chambers under control of the respective digital signals to exert signal forces on the respective piston faces.

14. The combination defined in claim 12, and including also:

structure for producing a command force;

and means for applying the command force as a control force to said pressure regulating valve means; and whereby said fluid pressure is developed under joint control of the command force and said signal forces.

15. The combination defined in claim 14, and in which:

said pressure regulating valve means comprise two stages of pressure regulation, a first stage acting to develop an intermediate fluid pressure and a second stage responsive to the intermediate pressure and acting to develop the output pressure; and said command force being supplied as control force to one of said stages and said signal forces being supplied as control forces to the other stage.

16. In a system for supplying to a hydraulic brake of a vehicle wheel a brake operating pressure normally responsive to a command signal that is variable within a limited range, and for selectively limiting the maximum value of the brake pressure under control of a control signal, the combination of:

means for providing fluid at a predetermined supply pressure;

first pressure regulating valve means for receiving fluid at the supply pressure and for developing a control pressure having a limiting maximum value;

second pressure regulating valve means for receiving fluid at the supply pressure and for developing an output pressure equal to the product of the control pressure and a constant of proportionality, said second valve means including means acting under control of the control signal to vary the constant of proportionality;

said first valve means including means for comparing the output pressure and the command signal and normally acting to modify the control pressure in a direction to make the output pressure correspond to the command signal;

the control signal having a range of variation that includes at least one value for which the constant of proportionality is sufficiently large that the control pressure for which the output pressure corresponds to the maximum command signal does not exceed said maximum control pressure value, and includes at least one other value for which the constant of proportionality is sufficiently small that the control pressure for which the output pressure corresponds to the maximum command signal exceeds said maximum control pressure value;

whereby, in presence of a control signal having said other value, the output pressure is limited to a value less than the value corresponding to the maximum command signal; and means for supplying to the brake a brake operating pressure derived from the output pressure.

17. The combination defined by claim 16, and in which said maximum value of the control pressure is essentially equal to the supply pressure.

18. The combination defined by claim 16, and in which:

said second pressure regulating valve means comprise piston structure exposed on one side to the control pressure and exposed on the other side to the output pressure, and valve means responsive to the force developed on the piston structure; and said means for varying the constant of proportionality comprise means acting under control of the control signal for varying the effective size of the working area on at least one side of the piston.

19. The combination defined by claim 16, and in which said second pressure regulating valve means comprise:

piston means having a plurality of piston faces acting in distinct cylinder chambers;

individual valves for supplying fluid at the control pressure selectively to the respective chambers in response to variations in the control signal to exert a variable force on the piston means; and valve means acting to maintain the output pressure proportional to said force.

20. In a skid control system for a vehicle having a plurality of braked wheels, each wheel brake being actuable in response to a brake actuating fluid pressure, the combination of:

means for developing a command signal;

valve means normally acting to supply to all said brakes a brake actuating pressure corresponding to the command signal;

sensing means for developing a control signal that varies in accordance with the vehicle deceleration;

adaptive control means responsive to the control signal for overriding said command signal to limit the value of the brake actuating pressure when the control signal corresponds to a value of vehicle deceleration less than a critical value;

skid sensing means for each wheel for developing a skid signal in response to a wheel skid condition; and skid control means responsive to the skid signals for further limiting the value of the brake actuating pressure at least for the skidding wheel.

21. The combination defined in claim 20, and in which said adaptive control means act to limit the value of the brake actuating pressure to a maximum value that is substantially independent of the command signal and that decreases with decreasing vehicle deceleration.

22. The combination defined in claim 20, and in which said adaptive control means act to limit the value of the brake actuating pressure to a definite fraction less than unity of the value normally corresponding to the command signal, said fraction decreasing with decreasing vehicle deceleration.

23. The combination defined in claim 22, and in which said fraction has a predetermined minimum value that is sufficient to produce a brake actuating pressure normally effective to increase the existing rate of vehicle deceleration.

24. The combination defined in claim 20, and including also:

means responsive jointly to said skid signals and producing a total skid signal; and means controlled by the total skid signal for modifying said control signal in a direction corresponding to smaller rate of vehicle deceleration.

25. The combination defined in claim 20, and including also:

means for supplying to the skid sensing means a reference signal representing the vehicle deceleration; and said skid sensing means comprising means for developing a wheel signal representing the rate of wheel deceleration, and means for effectively subtracting the reference signal from the wheel signal.

26. The combination defined in claim 20, and in which said skid sensing means comprise:

means for developing an electrical signal representing the excess of the rate of wheel deceleration above a threshold value;

and means for converting the electrical signal to a plurality of digital code signals; and said skid control means act stepwise under control of the digital code signals.

27. In a skid control system for a vehicle having a plurality of braked wheels operating on a supporting surface, each wheel brake being actuable in response to a brake actuating fluid pressure, the combination of:

a source of fluid pressurized at a source pressure;

means for developing a variable command signal;

first valve means receiving input fluid at said source pressure and acting under control of the command signal to produce a corresponding command pressure;

road sensing means for developing a control signal that represents a function of a measurable physical quantity indicative of the condition of the surface;

second valve means receiving input fluid at said source pressure and acting under joint control of the command pressure and the control signal to produce a corresponding control pressure;

skid sensing means for developing a skid signal that represents a wheel skid condition;

third valve means receiving input fluid at said source pressure and acting under joint control of the control pressure and the skid signal to produce a corresponding brake pressure; and brake supply means for supplying to a wheel brake a brake actuating pressure derived from the brake pressure.

28. The combination defined in claim 27, and in which:

said skid sensing means comprise means for producing a skid signal in response to a skid condition of any one of the braked wheels; and said brake supply means comprise means for supplying in parallel to all of the wheel brakes a brake actuating pressure derived from said brake pressure.

29. In a skid control system for a vehicle having a plurality of braked wheels, each wheel brake being actuable in response to a brake actuating fluid pressure, the combination of:

sensing means for developing electrical speed signals representing the speeds of the respective wheels;

means for differentiating each speed signal to produce a wheel deceleration signal;

means for deriving from the speed signals a vehicle signal representing the vehicle deceleration;

means responsive to the vehicle deceleration signal and to the respective wheel deceleration signals for producing a skid signal for each wheel when the wheel deceleration minus the vehicle deceleration exceeds a threshold value; and skid control means acting under control of the skid signals for modifying the brake actuating pressures delivered to the respective wheel brakes.

30. The combination defined in claim 29, and in which said vehicle signal deriving means comprise:

means acting to select the wheel speed signal that represents the highest wheel speed; and means for differentiating the selected signal.

31. The combination defined in claim 29, and including also:

means responsive jointly to said skid signals for producing a combined skid signal; and means for effectively subtracting the combined skid signal from said vehicle deceleration signal to effectively decrease said threshold value.

32. Pressure regulating valve mechanism responsive to a plurality of digital control signals that correspond to respective code digits of different numerical significance and that form a digital code representation of a variable quantity, said valve mechanism comprising:

a pressure regulating valve responsive to an applied control force and acting to produce an output pressure corresponding to the control force;

piston mechanism having respective piston faces which work in distinct cylinder chambers and which have respective working areas corresponding to the numerical significance of the respective digits;

a valve for each chamber acting selectively under control of the corresponding digital signal to supply fluid at a control pressure to the chamber to exert on the piston face a component force that corresponds in magnitude to the signal and to the numerical significance of the associated digit;

coupling structure for applying to the pressure regulating valve a control force corresponding to the sum of the component forces.